No. 830,743. PATENTED SEPT. 11, 1906.
F. M. RICHARDS & E. HUBBARD.
DEVICE FOR HEATING AND COOLING MILK.
APPLICATION FILED JAN. 29, 1906.
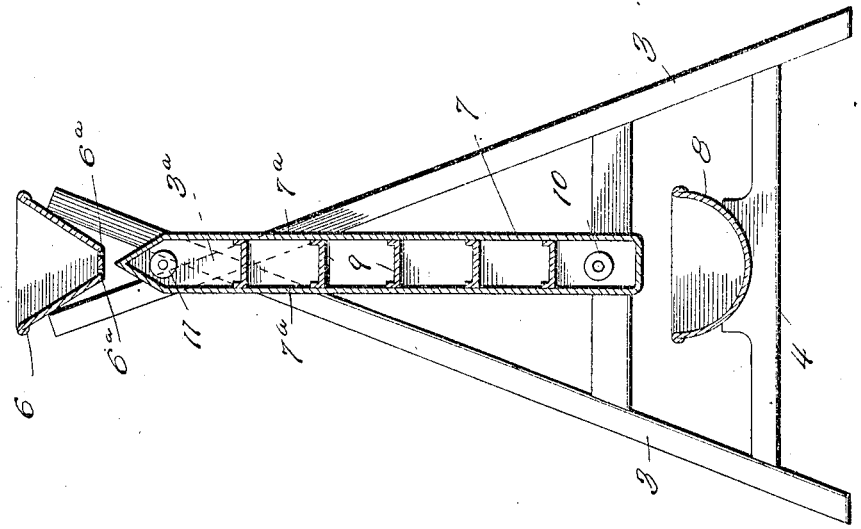
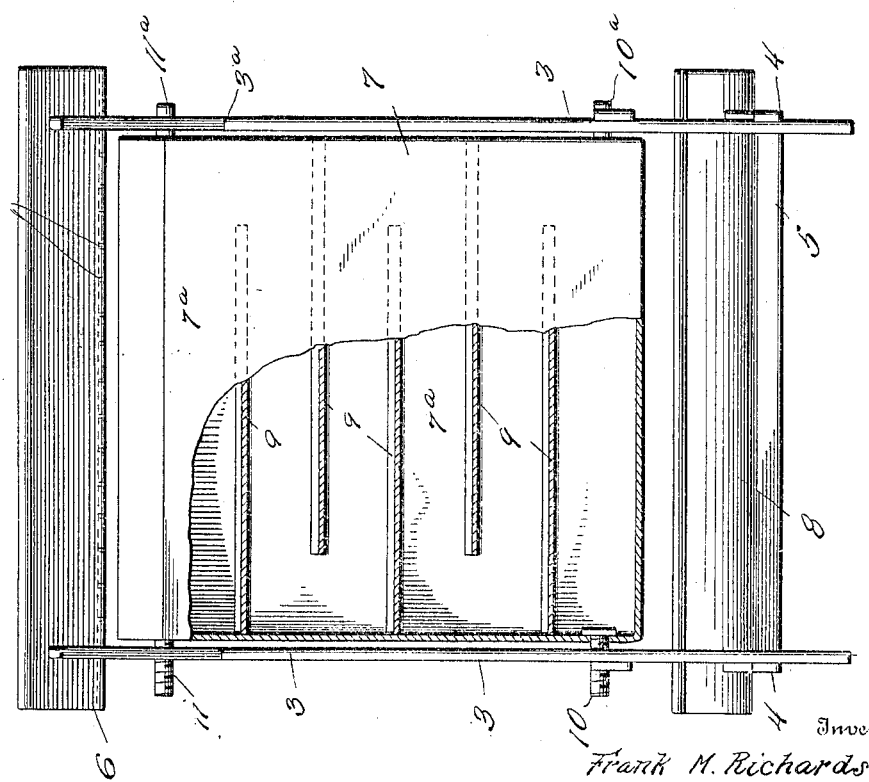
Witnesses
C. R. Thomas
Edward N. Sarton
Inventors
Frank M. Richards
Eugene Hubbard
By Spear, Middleton, Donaldson & Spear,
Attorneys

UNITED STATES PATENT OFFICE.

FRANK M. RICHARDS AND EUGENE HUBBARD, OF BAINBRIDGE, NEW YORK.

DEVICE FOR HEATING AND COOLING MILK.

No. 830,743. Specification of Letters Patent. Patented Sept. 11, 1906.

Application filed January 29, 1906. Serial No. 298,512.

*To all whom it may concern:*

Be it known that we, FRANK M. RICHARDS and EUGENE HUBBARD, citizens of the United States, residing at Bainbridge, Chenango county, New York, have invented certain new and useful Improvements in Devices for Heating or Cooling Milk, of which the following is a specification.

Our invention relates to improvements in devices for heating or cooling milk, and we have aimed in devising the present invention to produce an extremely simple, economical, efficient, and antiseptic device.

The invention includes the features of construction and arrangement and combination of parts hereinafter described, and particularly set forth in the appended claim.

We have illustrated the invention in the accompanying drawings, in which—

Figure 1 is a side elevation, partly broken away; and Fig. 2 is a transverse section.

Referring more particularly to the figures, it will be seen that we provide a stand or support which may conveniently be formed of inclined members 3, crossing each other at the upper end, as indicated at $3^a$, and connected near the lower ends by cross-bars 4 and longitudinal bars 5. In the V-shaped space between the upper ends of the standards 3 is supported a trough 6, in which the milk to be treated is poured and from which it is discharged through a double row of perforations $6^a$ in the bottom, so as to trickle down over the opposite sides of the cooling or heating sections 7, hereinafter more particularly described. After leaving said section the milk drops into a cooling-trough 8, supported by the cross-bars 4.

The cooling or heating section or device 7, above referred to, consists of a rectangular chamber having its side walls $7^a$ placed close to each other and within it a plurality of zigzag partitions or troughs 9. A nipple 10 is connected to one of the lower corners and serves as an inlet for the heating or cooling medium, which may be supplied through a suitable pipe, while a similar nipple 11 from one of the upper corners, serves to carry off the liquid after it has traversed the zigzag space formed by the partitions above referred to. The opposite corners are provided with lugs or projecting bolts $10^a$ and $11^a$, and the nipples and lugs serve as a means for supporting the section in the frame, the upper nipple and lug resting in the V-shaped recess or space between the upper ends of the arms, while the lower nipple and lug rest in recesses formed in the upper cross-bars which connect the standards. The upper end of the cooling-section is made wedge shape, the point of the wedge terminating between the rows of perforations in the trough, so that the milk trickles down upon both sides of the cooling-section.

From the foregoing description it is thought that the operation of our invention will be obvious; but it may be briefly stated as follows: The milk is poured into the upper trough and trickles down upon both sides of the vertical section, and after having been subjected to the action of the medium circulating in the zigzag space within the vertical section it drops into the cooling-trough beneath. If the milk is to be cooled, cold water, brine, or any other cooling medium may be made use of, while if the milk is to be heated hot water, steam, or any other fluid may be used. According to the manner in which the vertical section is suspended it may be readily removed for cleaning, as can also the troughs.

Having thus described our invention, what we claim is—

In combination a frame comprising two pairs of cross members suitably connected together, a perforated trough supported between the crossed upper ends of said members, a hollow member having projections also supported by said crossed upper ends, said hollow member having a zigzag passage within the same with means for supplying heating or cooling fluid thereto, and a cooling-trough supported by the lower part of the frame, substantially as described.

In testimony whereof we affix our signatures in presence of two witnesses.

FRANK M. RICHARDS.
EUGENE HUBBARD.

Witnesses:
C. J. FISHER,
W. H. MOSHER.